United States Patent [19]

Bhowmik et al.

[11] Patent Number: 4,698,815
[45] Date of Patent: Oct. 6, 1987

[54] EFFICIENCY ENHANCED FREE ELECTRON LASER

[75] Inventors: Anup Bhowmik, Newbury Park; Wayne A. McMullin, Chatsworth, both of Calif.

[73] Assignee: Rockwell International Corporation, El Segundo, Calif.

[21] Appl. No.: 917,340

[22] Filed: Oct. 9, 1986

[51] Int. Cl.$^4$ .................................................. H01S 3/00
[52] U.S. Cl. ........................................... 372/2; 372/37
[58] Field of Search ....................... 372/2, 37; 315/4, 5

[56] References Cited

U.S. PATENT DOCUMENTS 3,822,410  7/1974  Madey .................................. 331/94.5

OTHER PUBLICATIONS

Hiddleston, H. R., Segall, S. B., Catella, G. C., "Gain--Enhanced Free Electron Laser with an Electromagnetic Pump Field", Phys. Quantum Electron., vol. 9, pp. 849–865, 1982.

Sprangle, P., Tang, C. M., Bernstein, I., "The Evolution of Spontaneous and Coherent Radiation in the Free Electron Laser Oscillator", NRL Memorandum Report 5110, Aug. 16, 1983, pp. i–36.

Taguchi, T., Mima, K., Mochizuki, T., "Nonlinear Saturation Mechanisms and Improvement in Free-Electron Lasers", Institute of Laser Engineering, Osaka University, Japan, pp. 817–848., Phys. Quantum Electron., vol. 9.

Kroll, N. M., Morton, P. L., Rosenbluth, M. N., "Free-Electron Lasers with Variable Parameter Wigglers", IEEE Journal of Quantum Electronics, vol. QE-17, No. 8, Aug. 1981, pp. 1436–1468.

Gover, A., Tang, C. M., Sprangle, P., "Feasibility of dc to Visible High-Power Conversion Employing a Stimulated Compton Free Electron Laser . . . ", Journal of Applied Physics 53(1), Jan. 1982, pp. 124–129.

Takeda, H., Segall, S. B., "Amplifier Optimization Study for an FEL Wiggler with a Helical Magnetic Field and an Axial Electric Field", IEEE Transactions on Nuclear Science., vol. NS-30, No. 4, Aug. 1983, pp. 3112–3114.

Bhowmik, A., Cover, R. A., McMullin, W. A., "Comparison of dc Electric Field and Tapered Wiggler Free Electron Laser Efficiency Enhancement Schemes", IEEE Journal of Quantum Electronics, vol. QE-21, No. 7, Jul. 1985, pp. 998–1006.

Gover, A., Tang, C. M., Sprangle, "Design Considerations of a Compton Scattering Free-Electron Laser with an Axial Electric Field", Phys. Quantum Electron., vol. 9 pp. 795–815, 1982.

*Primary Examiner*—Leon Scott, Jr.
*Attorney, Agent, or Firm*—H. Frederick Hamann; Harry B. Field; Lawrence N. Ginsberg

[57] ABSTRACT

An apparatus and method for enhancing the efficiency of a free electron laser, (10). A plurality of electrodes, (28) are imbedded in an electrically insulating vacuum tube, (18) enclosing the electron beam, (14) and its co-propagating electromagnetic wave. A variable computer controlled high voltage d.c. power supply, (29) is connected to the electrodes, (28) for energizing the electrodes, (28) at saturation indicated by detectors, (30) thereby converting d.c. electric potential to electromagnetic radiation without gain degradation.

15 Claims, 4 Drawing Figures

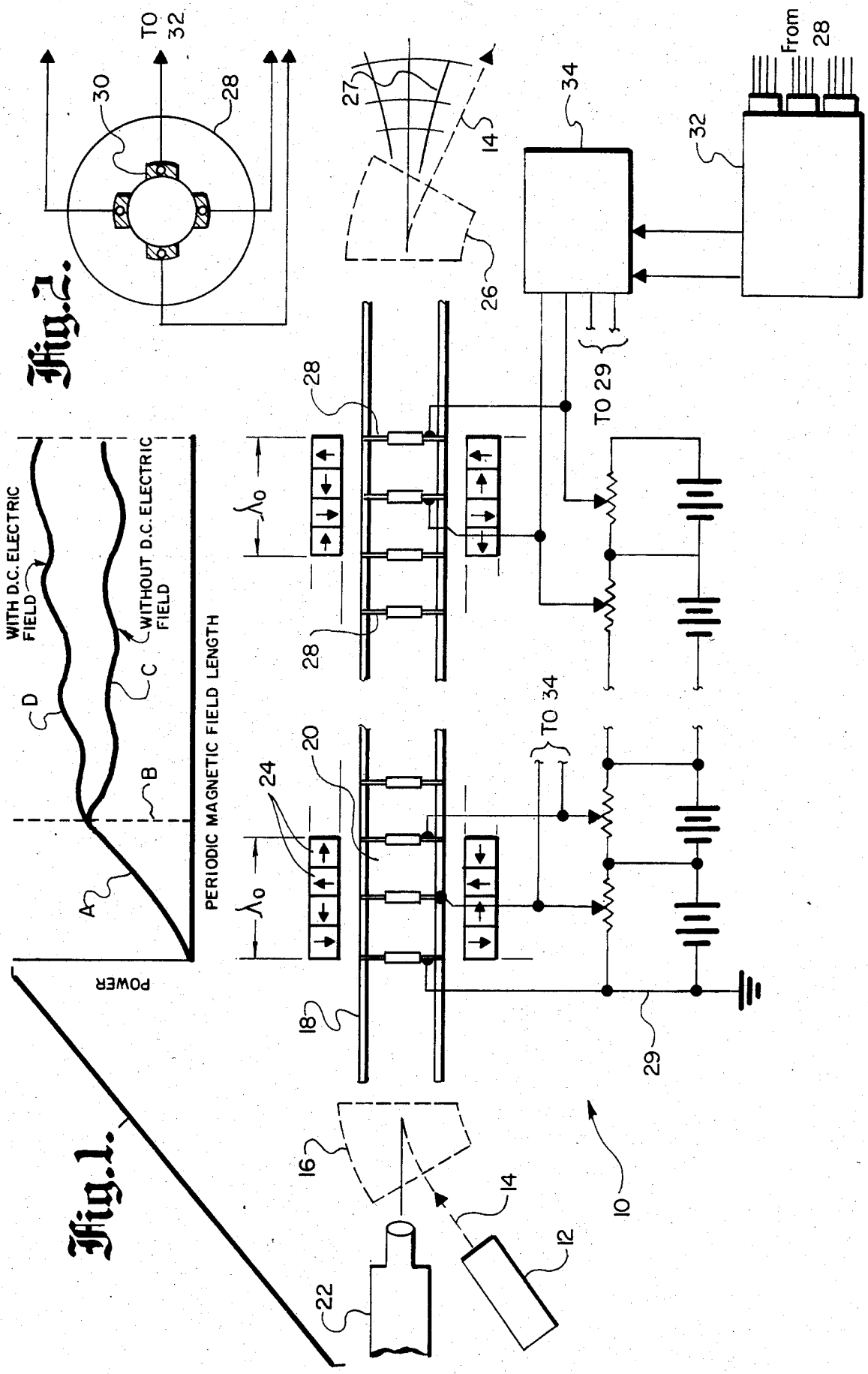

EFFICIENCY ENHANCED FREE ELECTRON LASER

BACKGROUND OF THE INVENTION

1. Field of the Invention

This invention relates to high powered coherent radiation sources and more particularly to an efficient, continuously tunable free electron laser which can efficiently generate high power radiation in the cenlimeter, millimeter, infrared, and optical wavelength range.

2. Description of the Prior Art

During the past ten years there has been a great deal of interest in using a relativistic electron beam passing through a periodic, transverse d.c. magnetic field to generate or amplify tunable coherent radiation as considered by J. M. J. Madey. U.S. Pat. No. 3,822,410 and is known as the free electron laser (FEL). In the FEL an electron accelerator provides a relativistic electron beam of energy $E = \gamma Mc^2$ where M is the electron rest mass. c is the speed of light in vacuum. and $\gamma^{-2} = 1 - v^2/c^2$ with v being the electron velocity. The electron beam passes through an injection magnet which steers the electron beam such that the electron beam enters a periodic, transverse, d.c. magnetic field on the axis of this magnetic field. The electron beam travels parallel to the axis of the periodic. transverse, d.c. magnetic field over the entire length of the magnetic field. The periodic, transverse. d.c. magnetic field accelerates the electrons periodically in the direction transverse to the axis of the magnetic field, thereby causing the electrons to spontaneously emit polarized radiation that travels in the same direction the electron beam is traveling. The wavelength of the emitted radiation is given by $$\lambda = \frac{\lambda_o}{2\gamma^2}(1 + \tfrac{1}{2}a_o^2) \quad (1)$$

where $$a_o = \frac{eB_o\lambda_o}{Mc^2 2\pi},$$

e is the electron charge, $\lambda_o$ is the constant period of the transverse, d.c. magnetic field, and $B_o$ is the constant amplitude of the transverse. d.c. magnetic field. The emitted radiation wavelength can be changed by either varying $\gamma$ or the magnetic field amplitude $B_o$. After the electrons have passed through the periodic, transverse, d.c. magnetic field, they pass through a bending magnet that steers them away from the radiation beam path. For a constant period and constant amplitude transverse d.c. magnetic field free electron laser, the conversion efficiency of electron kinetic energy into radiant energy is typically limited to values of less than one percent. in order to improve the energy conversion efficiency, it has been proposed to vary the transverse d.c. magnetic field period and/or amplitude along the length of the magnet subject to the constraint that the output radiation wavelength remain constant. (U.S. Pat. No. 3,822,410 by J. M. J. Madey; and "Free Electron Lasers With Variable Parameter Wigglers", by N. M. Kroll, P. L. Morton, and M. N. Rosenbluth. IEEE J. Quantum Electron, Vol. QE-17, No. 8, pp. 1436-1468, August 1981.) Although varying the magnetic field period and/or amplitude along its length can improve the energy conversion efficiency an order of magnitude or more over that of the constant parameter device, the small signal gain of the varying magnetic field device is typically much less than that of the constant parameter free electron laser. It is necessary to have the small signal gain as large as possible to quickly reach the saturated state where the varying magnetic field technique improves the energy conversion efficiency. If the small signal gain is not large, the device needs to be made longer so that it will reach the saturated state.

Another proposed technique for improving the energy conversion efficiency is to apply an axial d.c. electric field along the entire length of a free electron laser that utilizes a constant period and amplitude periodic, transverse d.c. magnetic field. Studies have been made in this area by A. Gover, C. M. Tang, and P. Sprangle, "Design Considerations of a Compton Scattering Free Electron Laser With an Axial Electric Field", Phys. Quantum Electron., Vol. 9, pp. 795-815. 1982; H. R. Hiddleston, S. B. Segall, and G. C. Catella, "Gain Enhanced Free Electron Laser with an Electromagnetic Pump Field", Phys. Quantum Electron., Vol. 9, pp. 849-865, 1982; T. Taguchi, K. Mima. and T. Mochizuki. "Nonlinear Saturation Mechanisms and Improvement in Free Electron Lasers", Phys. Quantum Electron., Vol. 9, pp. 817-848, 1982; H. Takeda and S. B. Segall, "Amplifier Optimization Study for an FEL Wiggler with a Helical Magnetic Field and an Axial Electric Field, " IEEE Trans. Nucl. Sci., Vol. NS-30, pp 3112-3114, August 1983; A. Bhowmik, R. A. Cover, and W. A. McMullin, "Comparison of D.C. Electric Field and Tapered Wiggler Free Electron Laser Efficiency Enhancement Schemes", IEEE J. Quantum Electron., Vol QE-21, pp. 998-1006, July 1985. However, applying an axial d.c. electric field along the whole length of the free electron laser, like varying the magnetic field period and/or amplitude, has the drawback of degrading the small signal gain.

OBJECTS OF THE INVENTION

A principal object of the invention therefore is to provide a means for increasing the energy conversion efficiency of a FEL without degrading the small signal gain.

Another object is to provide increased energy conversion efficiency when the FEL is tuned to a new frequency.

Yet another object is to provide a compact and economical means for enhancing the efficiency of a FEL.

Other objects, advantages and novel features of the present invention will become apparent from the following detailed description of the invention when considered in conjunction with the accompanying drawing.

SUMMARY OF THE INVENTION

In its broadest aspects the efficiency enhanced free electron laser of the present invention involves the application of a d.c. electric field along the axis of the electron beam at saturation. This allows the conversion of d.c. electric potential to electromagnetic radiation without degrading the small signal gain.

In its more narrower aspects. the invention includes energizing a plurality of electrodes imbedded in an electrically insulating vacuum tube enclosing the electron beam and electromagnetic wave of the free electron laser.

Where the free electron laser is operated as an amplifier, electrodes are energized at a certain axial location on the free electron laser where saturation occurs.

Where the free electron laser is operated as a laser oscillator, the electrodes are energized at the time when saturation occurs.

BRIEF DESCRIPTION OF THE DRAWINGS

FIG. 1 contains a schematic illustration of the FEL with enhanced efficiency, operated as an amplifier. This figure also includes a plot of Power vs. Periodic Magnetic Field Length.

FIG. 2 is an end view of an electrode.

The same elements or parts throughout the figures are designated by the same reference characters.

The same elements or parts throughout the figures of the drawings are designated by the same reference characters, while equivalent elements bear a prime designation.

DETAILED DESCRIPTION OF THE INVENTION

Figures 3, 4:
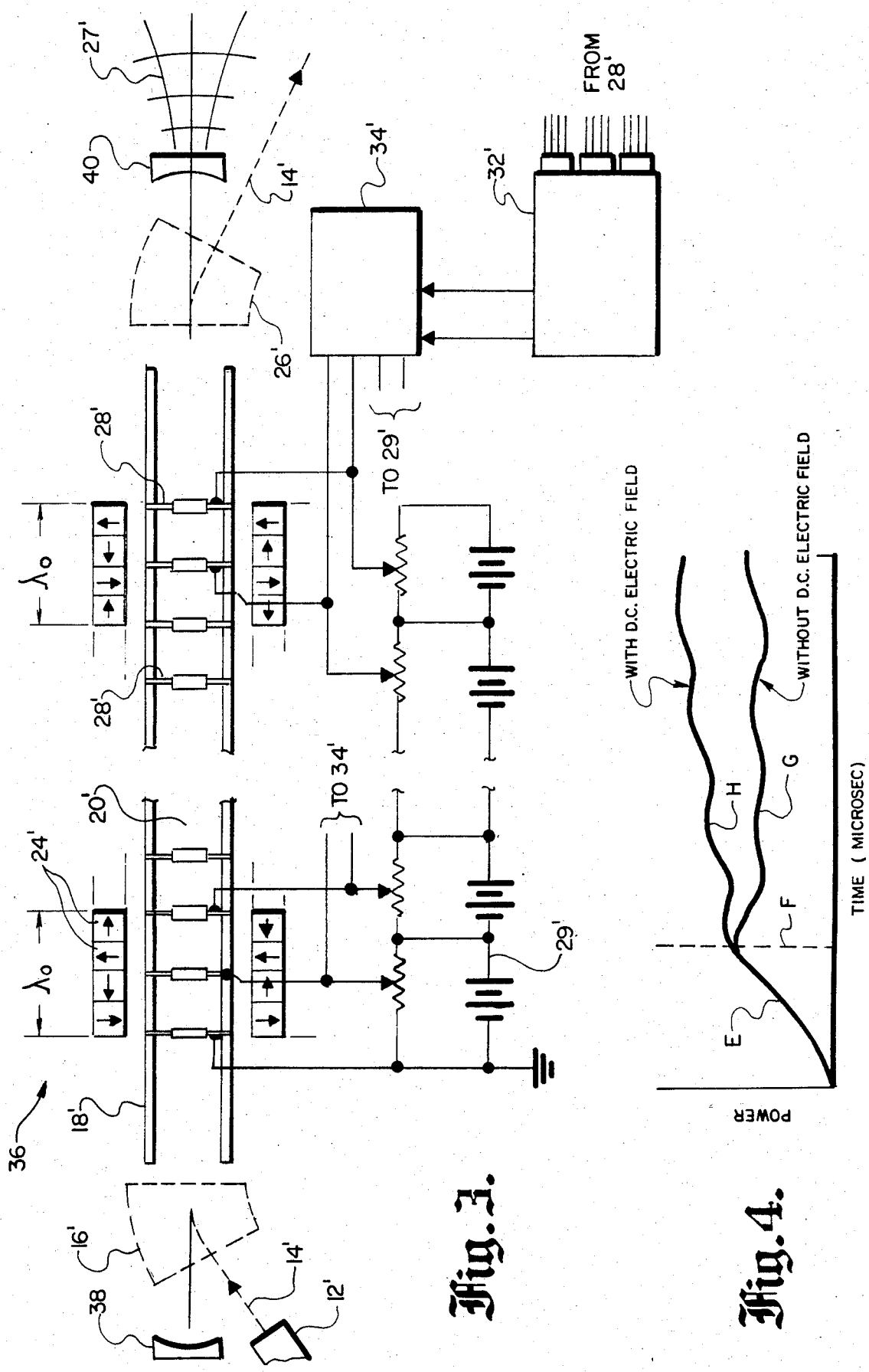
FIG. 3 contains a schematic illustration of the FEL with enhanced efficiency, operated as an oscillator.
FIG. 4 includes a plot of Power vs. Time for the oscillator.

The present device provides an efficient method for either amplifying or generating intense, tunable coherent radiation in the centimeter, millimeter, infrared, and optical wavelength regions of the electromagnetic spectrum without degrading the small signal gain. As previously noted, the mere application of an axial d.c. electric field enhances extraction efficiency at the expense of small signal gain. Applicants have found that by applying a d.c. electric field at saturation no degradation in small signal gain occurs. Although FEL's are tuneable to a new frequency by changing the electron energy $\gamma$ or the magnetic field strength $B_o$, at the new frequency the small signal gain and therefore the efficiency can be significantly reduced. This invention provides a technique for tuning the FEL to a new frequency by changing $\gamma$ or $B_o$ while preserving the small signal gain and therefore maintaining a high extraction efficiency. Furthermore, since the present invention relies on adjustment of the applied axial d.c. electric field under computer control, adjustment to a new frequency is accomplished rapidly and automatically.

In the small signal gain regime of a FEL the radiation field amplitude grows exponentially until the amplitude becomes large enough so that the electrons become trapped in the ponderomotive bunching potential wells they are interacting with. The ponderomotive potential well travels at the constant phase velocity $\omega/(k+kd_o)$ where $k_o = 2\pi/\lambda_o$, $\omega$ and $k$ are the radiation angular frequency and wavenumber, respectively. When the electrons become trapped, the FEL saturates with the electron velocity on the average being the same as the ponderomotive potential well phase velocity. The electrons then no longer give up kinetic energy to the radiation field.

In order to improve the energy extraction efficiency when the device saturates, a variable strength, d.c., axial electric field is provided starting where the FEL device begins to saturate. The field strength of the d.c., axial electric field is adjusted to a value large enough so that it just compensates for the energy the electron loses to the radiation field without detrapping the electron. The energy supplied by the d.c., axial electric field is thereby directly transformed into radiation energy. Since the applied d.c., axial electric field strength is variable, if the output wavelength of the device is changed the strength of the d.c., axial electric field can be readily changed to provide the high energy extraction efficiency at the new output wavelength. Also, since the d.c., axial electric field is applied where the device is saturated, the device provides large small signal gain so that it saturates quickly whereas a device using a tapered, periodic, transverse, d.c. magnetic field for extraction efficiency enhancement provides a smaller small signal gain so that the device takes longer to reach saturation.

The device can be operated as an amplifier designated generally as 10 in FIG. 1. An electron accelerator 12 provides a relativistic electron beam 14. The electron beam 14 passes through an injection (bending) magnet 16 which steers the electron beam 14 accurately into a pyrex or other suitable insulating vacuum tube 18. Radiation of the same polarization, frequency and wave number as the spontaneous emission is injected into the interaction region 20 within vacuum tube 18 from an external source 22 such as an input laser master oscillator. A periodic, transverse, d.c. magnetic field created by magnets 24 accelerates the electrons and causes them to spontaneously emit polarized radiation. An output bending magnet 26 is contained at the downstream end of the FEL for steering the electron beam out of the resultant amplified radiation path 27.

The present invention includes a plurality of spaced electrodes 28 embedded along the length of the vacuum tube 18. The electrodes 28 are connected to and are energized by a d.c. electric power supply 29. As shown in FIG. 2 each electrode includes light detectors 30 which connect to a control computer 32 which supplies appropriate information for a voltage controller 34 for the power supply 29. The detectors 30 determine the location where the FEL begins to saturate. Detectors 30 are commercially available semiconductor materials such as germanium, silicon or mercury-cadmium-telluride.

As shown in region A of the plot of Power vs. Periodic Magnetic Field Length in FIG. 1, at the beginning of the interaction region 20 the radiation is amplified exponentially. This power increase is maintained until saturation point B. Without the introduction of a d.c. electric field (see curve C), as the radiation continues to travel through the interaction region 20 the power output levels off. However, as shown in curve D which represents the instance where a d.c. electric field is utilized, if d.c. electric field is introduced at the point when the FEL 10 begins to saturate, and is terminated at the end of the periodic, transverse, d.c. magnetic field, the power continues to increase even beyond the saturation point B. The energy extraction efficiency of the device is thereby increased over that of an FEL without an axial, d.c. electric field.

The device can also be operated as a laser oscillator generally designated 36 in FIG. 3. Mirrors 38,40 are placed in the path of the spontaneous radiation with stimulated emission occurring. The stimulated emission radiation has the same polarization, frequency, and wavenumber as the spontaneous emission. The stimulated radiation is amplified and coherent. In order to improve the energy extraction efficiency for the continuously tunable laser oscillator 36 a variable strength, d.c., axial electric field is provided over the entire length of the periodic, transverse, d.c. magnetic field. In order to allow for a large small signal gain so that the radiation field amplitude grows exponentially. the applied d.c., axial electric field must be remain off until a time such that the device begins to saturate.

The detectors 30 determine the time when the FEL begins to saturate. At this time the control computer 32' sends appropriate signals to voltage controller 34 to turn on the power supply 29'. The applied d.c., axial electric field is then turned on, and the device has the same advantages as the previously described amplifier configuration. FIG. 4 is a plot of Power vs. Time for the oscillator configuration. Curve E shows an exponential increase in power. After saturation point F, without the introduction of a d.c. electric field, the power levels off, as shown in curve G. However, if the electric field power supply 28' is turned on at the time the device begins to saturate. as shown in curve H. a greater power level is achieved before it levels off. The turn on time for the applied d.c., axial electric field is typically on the order of a few microseconds.

Obviously, many modifications and variations of the present invention are possible in light of the above teachings. It is therefore to be understood that, within the scope of the appended claims, the invention mav be practiced otherwise than as specifically described.

What is claimed and desired to be secured by Letters Patent of the United States is:

1. A method for enhancing the efficiency of a free electron laser having a relativistic electron beam superimposed and copropagating with an intense electromagnetic wave within a transverse periodic d.c. magnetic field, including the step of:
   applying a d.c. electric field along the axis of the electron beam at saturation thereby converting d.c. potential to electromagnetic radiation without gain degradation.

2. The method of claim 1 further including the step of frequency tuning said free electron laser.

3. The method of claim 2 wherein said free electron laser is tuned by varying the electron beam energy.

4. The method of claim 2 wherein said free electron laser is tuned by varying the strength of said traverse periodic magnetic field.

5. The method of claim 2 wherein said d.c. electric field is applied by energizing a plurality of electrodes imbedded in an electrically insulating vacuum tube enclosing said electron beam and electromagnetic wave.

6. The method of claim 5 wherein said free electron laser is operated as an amplifier and the electrodes are energized at a certain axial location on said free electron laser where saturation occurs.

7. The method of claim 6 further including the step of:
detecting the intensity of the electromagnetic wave being amplified to determine its point of saturation.

8. Ihe method of claim 5 wherein said free electron laser is operated as a laser oscillator and said electrodes are energized at the time when saturation occurs.

9. The method of claim 8 further including the step of detecting the intensity of the electromagnetic wave being amplified to determine its time of saturation.

10. An apparatus for enhancing the efficiency of a tuneable free electron laser having a relativistic electron beam superimposed and copropagating with an intense electromagnetic wave within a transverse periodic d.c. magnetic field, comprising:
    a plurality of electrodes embedded in an electrically insulating vacuum tube enclosing said electron beam and electromagnetic wave; and
    a variable, computer controlled high voltage d.c. power supply connected to said electrodes for energizing said electrodes at saturation thereby converting d.c. electric potential to electromagnetic radiation without gain degradation.

11. The apparatus of claim 10 further including detection means connected to a computer for controlling said high voltage d.c. power supply, said detection means detecting the intensity of electromagnetic radiation within the free electron laser.

12. An apparatus for enhancing the efficiency of a tuneable free electron laser having a relativistic electron beam superimposed and copropagating with an intense electromagnetic wave within a transverse periodic d.c. magnetic field, comprising:
    means for applying a d.c. electric field along the axis of the electron beam at saturation thereby converting d.c. potential to electromagnetic radiation without gain degradation.

13. Ihe apparatus of claim 12 wherein said means for applying said d.c. electric field includes:
    detecting means for detecting the intensity of the electromagnetic wave to determine saturation, said detecting means providing an output signal;
    a plurality of electrodes supported in an electrically insulating vacuum tube enclosing said electron beam and electromagnetic wave;
    a variable, high-voltage d.c. power supply for energizing said electrodes; and
    controlling means for receiving said output signal and for supplying a control signal to said high voltage d.c. power supply for energizing said electrodes for a preprogrammed potential.

14. The apparatus of claim 13 wherein said free electron laser is operated as an amplifier and the electrodes are energized at a certain axial location on said free electron laser where saturation occurs.

15. The apparatus of claim 13 wherein said free electron laser is operated as a laser oscillator and said electrodes are energized at the time when saturation occurs.

* * * * *